United States Patent
Mihaljevic et al.

(10) Patent No.: US 8,023,649 B2
(45) Date of Patent: Sep. 20, 2011

(54) METHOD AND APPARATUS FOR CELLULAR AUTOMATA BASED GENERATION OF PSEUDORANDOM SEQUENCES WITH CONTROLLABLE PERIOD

(75) Inventors: Miodrag J. Mihaljevic, Tokyo (JP); Jouji Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 977 days.

(21) Appl. No.: 10/578,505

(22) PCT Filed: Sep. 5, 2005

(86) PCT No.: PCT/JP2005/016686
§ 371 (c)(1),
(2), (4) Date: May 5, 2006

(87) PCT Pub. No.: WO2006/028235
PCT Pub. Date: Mar. 16, 2006

(65) Prior Publication Data
US 2008/0304667 A1    Dec. 11, 2008

(30) Foreign Application Priority Data
Sep. 6, 2004 (JP) ................................ 2004-258186

(51) Int. Cl.
*H04L 9/26* (2006.01)
*H04L 9/24* (2006.01)
*H04L 9/20* (2006.01)

(52) U.S. Cl. ............ 380/46; 380/47; 380/277; 380/268; 708/250; 708/253; 708/255; 708/256

(58) Field of Classification Search ........................ None
See application file for complete search history.

(56) References Cited

U.S. PATENT DOCUMENTS

| | | | |
|---|---|---|---|
| 5,331,581 A * | 7/1994 | Ohkubo et al. | 708/253 |
| 5,511,146 A * | 4/1996 | Simar, Jr. | 706/10 |
| 6,985,918 B2 * | 1/2006 | Shackleford et al. | 708/250 |
| 7,389,316 B1 * | 6/2008 | Baetoniu | 708/250 |
| 7,571,200 B2 * | 8/2009 | Shackleford et al. | 708/250 |
| 7,634,522 B1 * | 12/2009 | Carter et al. | 708/250 |
| 7,715,639 B2 * | 5/2010 | Ishikawa | 382/238 |
| 7,716,100 B2 * | 5/2010 | Metlapalli | 705/35 |
| 7,788,479 B2 * | 8/2010 | Ishii | 713/150 |
| 7,925,014 B2 * | 4/2011 | Kim et al. | 380/46 |
| 2003/0204541 A1 * | 10/2003 | Shackleford et al. | 708/250 |
| 2004/0006680 A1 * | 1/2004 | Duncan | 711/219 |

OTHER PUBLICATIONS

Cattell, Kevin et al., "2-by-n Hybrid Cellular Automata with Regular Configuration: Theory and Application", IEEE Transactions on Computers, vol. 48, No. 3, pp. 285-295, 1999.

Guan, Sheng-Uei et al., "An Evolutionary Approach to the Design of Controllable Cellular Automata Structure for Random Number Generation", IEEE Transactions on Evolutionary Computation, vol. 7, No. 1, pp. 23-35, 2003.

* cited by examiner

*Primary Examiner* — Syed Zia
(74) *Attorney, Agent, or Firm* — Oblon, Spivak, McClelland, Maier & Neustadt, L.L.P.

(57) ABSTRACT

A compact apparatus for generation of desired pseudorandom sequences with controllable period. The apparatus includes two-dimensional cellular automata for generating a first sequence, 2-by-L cellular automata for generating a second sequence, adders for performing bit-to-bit mod2 sum of the first sequences and the second sequences, and a buffer for buffering the resultant sequences from the adders.

15 Claims, 11 Drawing Sheets

RULE 63
 RULE 15
 RULE 47
 RULE 31

METHOD AND APPARATUS FOR CELLULAR AUTOMATA BASED GENERATION OF PSEUDORANDOM SEQUENCES WITH CONTROLLABLE PERIOD

TECHNICAL FIELD

This invention relates to a method and apparatus for generating pseudorandom sequences with controllable period employing a compact finite state machine.

BACKGROUND ART

Recently a plurality of methods for generation of pseudorandom sequences with very good statistical characteristics based on employment of cellular automata have been reported. For example, Non-Patent Document 1 discloses two-dimensional cellular automata for generating high quality random number. Below, typical two-dimensional cellular automata (2D-CA) are explained.

Cellular automata (CA) are dynamical systems in which space and time are discrete. A cellular automaton consists of an array of cells, each of which can be in one of a finite number of possible states, updated synchronously in discrete time steps, according to a local, interaction rule. Here, only Boolean automata in which the cellular state, s, $\in \{0,1\}$ is considered. The state of a cell at the next time step is determined by the current states of a surrounding neighborhood of cells.

The cellular array (grid) is d-dimensional, where d=1, 2, 3, is used in practice. In this section of the present specification, d=2, i.e., two-dimensional grids is considered.

The rule contained in each cell is essentially a finite state machine rule, usually specified in the form of a rule table (also known as the transition function), with an entry for every possible neighborhood configuration of states. The cellular neighborhood of a cell consists of itself and of the surrounding (adjacent) cells. For one-dimensional CAs, a cell is connected to r local neighbors (cells) on either side, where r is referred to as the radius (thus, each cell has 2r+1 neighbors).

For two-dimensional CA (2D-CA), two types of cellular neighborhoods are usually considered. Those are: five cells, consisting of the cell along with its four immediate non-diagonal neighbors (also known as the von Neumann neighborhood) and nine cells, consisting of the cell along with its eight surrounding neighbor. (also known as the Moore neighborhood).

When considering a finite-size grid, cyclic boundary conditions are frequently applied, resulting in a circular grid for the one-dimensional case and in a toroidal one for the two-dimensional case. Fixed, or null, boundary conditions can also be used, in which the grid is surrounded by an outer layer of cells in a fixed state of zero. This latter case is usually easier to implement in hardware.

Non-uniform, or inhomogeneous, cellular automata function in the same way as uniform ones, the only difference being in the cellular rules that need not be identical for all cells. Nonuniform CAs share the basic attractive properties of uniform ones: simplicity, parallelism, and locality.

A suitable background consideration of 2D-CA is available in Non-Patent Document 2, for example.

[Non-Patent Document 1]
M. Tomassini, M. Sipperand, M. Perrenoud, "On the generation of high-quality random number by two-dimensional cellular automata", IEEE Trans. Computers, vol. 49, pp. 1146-1151, October 2000

[Non-Patent Document 2]
P. P. Chaudhuri, D. R. Chaudhuri, S. Nandiand, S. Chattopadhyay, "Additive Cellular Automata: Theory and Applications", New York, IEEE Press, 1997.

[Non-Patent Document 3]
S. Wolfram, "Cryptography with Cellular Automata", Advances in cryptology—CRYPTO85, Lecture Notes in Computer Science, vol. 218, pp. 429-432, 1985

[Non-Patent Document 4]
K. Cattell, S. Zhang, M. Serraand, J. C. Muzio, "2-by-n hybrid cellular automata with regular configuration: Theory and application", IEEE Trans. Computers, vol. 48, pp. 285-295, March 1999

[Non-Patent Document 5]
A. Klimov and A. Shamir, "Cryptographic applications of T-functions", SAC'2003, pre-print 15 pages, August 2003, (to appear in Lecture Notes in Computer Science).

[Non-Patent Document 6]
S.-U. Guan and S. Zhang, "An evolutionary approach to the design of controllable cellular automata: structure for random number generation", IEEE Trans. Evolutionary Computation, vol. 7, pp. 23-36. February 2003.

[Non-Patent Document 7]
P. D. Hortensius, R. D. Mcleod, W. Pries, D. M. Miller and H. C. Card, "Cellular automata-base pseudorandom number generators for built-in self-test", IEEE Transactions on Computer-Aided Design, vol. 8, pp. 842-859, August 1989.

[Non-Patent Document 8]
M. Mihaljevic, M. P. C. Fossorier and H. Imai, "Fast correlation attack algorithm with the list decoding and an application", FSE2001, Lecture Notes in Computer Science, vol. 2355, pp. 196-210, 2002.

[Non-Patent Document 9]
N. T. Courtois and W. Meier, "Algebraic attacks on stream ciphers with linear feedback", EURO-CRYPT2003, Lecture Notes in Computer Science, vol. 2656, pp. 345-359, 2003.

[Non-Patent Document 10]
M. Mihaljevic and H. Imai, "A family of fast keystream generators based on programmable linear cellular automata over GF(q) and time variant table", IEICE Transactions on Fundamentals, vol. E82-A, pp. 32-39, January 1999.

[Non-Patent Document 11]
G. Marsaglia, "Diehard" (1998). http:JJstat.fsu.eduJ-geoJdiehard.htm.

[Non-Patent Document 12]
A. K. Das, A. Ganguly, A. Dasgupta, S. Bhawmik, and P. PalChaudhuri, "Efficient characterization of cellular automata", IEE Proc. Pt. E, vol. 137, pp. 81-87, January 1990.

[Non-Patent Document 13]
K. Cattell and J. C. Muzio, "Synthesis of one-dimensional linear hybrid cellular automata", IEEE Trans. Computer-Aided Design, vol. 15, pp. 325-335, March 1996.

[Non-Patent Document 14]
S. Nandi, B. K. Kar and P. Pal Chaudhuri, "Theory and applications of cellular automata in cryptography", IEEE Trans. Comput., vol. 43, pp. 1346-1357, December 1994.

[Non-Patent Document 15]
W. Meier and O. Staffelbach, "Analysis of pseudorandom sequences generated by cellular automata", Advances in Cryptology—EUROCRYPT 91, Lecture Notes in Computer Science, vol. 547, pp. 186-189, 1992.

[Non-Patent Document 16]
C. K. Koc and A. M. Apohan, "Inversion of cellular automata iterations", IEE Proc. Comput. Digit. Tech., vol.-144, pp. 279-284, 1997.

[Non-Patent Document 17]

M. Mihaljevic, "An improved key stream generator based on the programmable cellular automata", ICICS'97, Lecture Notes in Computer Science, vol. 1334, pp. 181-191, 1997.

[Non-Patent Document 18]

M. Mihaljevic, "Security examination of a cellular automata based pseudorandom bit generator using an algebraic replica approach", AAECC12, Lecture Notes in Computer Science, vol. 1255, pp. 250-262, 1997.

[Non-Patent Document 19]

S. R. Blackburn, S. Murphy and K. G. Peterson, "Comments on "Theory and Applications of Cellular Automata in Cryptography"", IEEE Trans. Comput., vol. 46, pp. 637-638, May 1997.

[Non-Patent Document 20]

M. Mihaljevic, "Security examination of a cellular automata based pseudorandom bit generator using an algebraic replica approach", AAECC12, Lecture Notes in Computer Science, vol. 1255, pp. 250-262, 1997.

[Non-Patent Document 21]

A. J. Menezes, P. C. van Oorschot and S. A. Vanstone, Handbook of Applied Cryptography. Boc. Roton: CRC Press, 1997.

DISCLOSURE OF THE INVENTION

Problems to be solved by the Invention

However, main drawback of these proposals described above is that there are no guarantee about the period of generated pseudorandom sequences. Accordingly, it is desirable to provide a method and apparatus for generating sequences with maximal or substantially maximal period with desired statistical properties of randomness as the above-described ones.

The present invention is made in view of the above. An object of the present invention is to provide a method and/or a compact apparatus for generation of desired pseudorandom sequences with controllable period.

Means for Solving the Problems

According to an embodiment of the present invention, there is provided an apparatus for generating pseudorandom sequences that is characterized by including: cellular automata of a first type for generating a first sequence with higher randomness; cellular automata of a second type for generating a second sequence with predetermined lower bound on the period; and adders for performing bit-to-bit mod2 sum of the first sequences and the second sequences.

In the apparatus according to the present embodiment, the cellular automata of a first type may be two-dimensional cellular automata, the cellular automata of a second type may be 2-by-L cellular automata; and the summation results from the adders may be outputted as the pseudorandom sequences.

According to another embodiment of the present invention, the apparatus according to the above described may further includes: cellular automata of a third type for generating a third sequence, the cellular automata of a third type having cells whose states can be computed based on corresponding cell control word and/or rule control word. In this embodiment, the cell control word is generated by the cellular automata of a second type; the rule control word is generated by the cellular automata of a first type; and the adders for performing bit-to-bit mod2 sum of the first, the second and the third sequences.

According to still another embodiment of the present invention, the above described apparatus may further includes; a block for performing nonlinear mapping on the summation results from the adders; and a block for perform non-uniform decimation on the results of the nonlinear mapping; wherein the decimated result is outputted as the pseudorandom sequence. In the present apparatus, each of the blocks may include at least one nonlinear function. Alternatively, the block for performing nonlinear mapping may include at least one look-up table for nonlinear mapping based on the Latin squares.

According to another embodiment of the present invention, an apparatus for performing cryptographic processing is provided. The apparatus is characterized by including: a cryptographic processor for encrypting data using pseudorandom sequences; and a pseudorandom sequence generator for generating the pseudorandom sequences. In the present embodiment, the pseudorandom number generator is configured to include the apparatus according to any one of above-described embodiments.

According to another embodiment of the present invention, a method for generating pseudorandom sequences using cellular automata, or a computer program to cause a computer to execute the method, or a storage medium storing the computer program. The method includes the steps of generating a first sequence with higher randomness; generating a second sequence with predetermined lower bound on the period; and performing bit-to-bit mod2 sum of the first sequences and the second sequences.

EFFECTS OF THE INVENTION

According to the present invention, there is provided a method and/or a compact apparatus for generation of desired pseudorandom sequences with controllable period.

BEST MODES FOR CARRYING OUT THE INVENTION

First Embodiment

Figure 1:
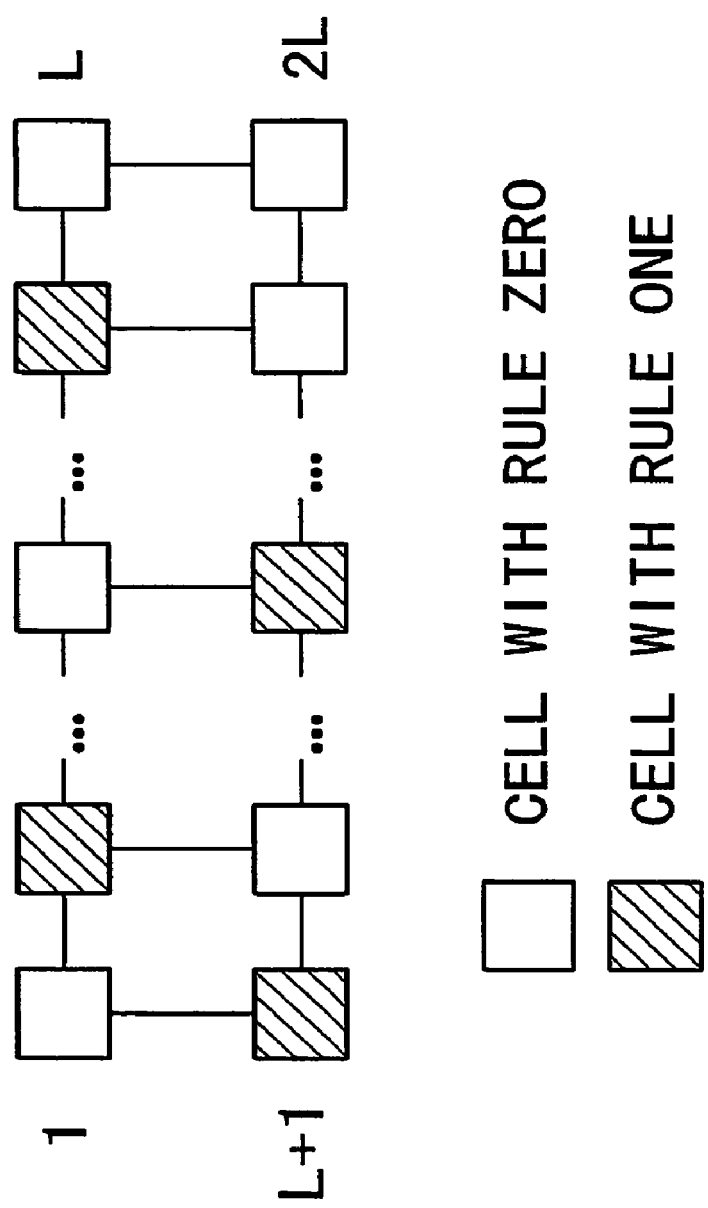
FIG. 1 is a schematic diagram showing an example of 2-by-L Cellular Automata.

According to a first embodiment of the present invention, there is provided a method and apparatus for generating pseudorandom sequences with controllable period employing a compact finite state machine. The apparatus according to the present embodiment is based on two different classes of cellular automata. The apparatus and method are flexible ones and yield opportunity for a trade-off between the space complexity and the lower bound on the sequence period.

Before describing the first embodiment of the present invention, some of basic technology on cellular automata, which are employed in the present embodiment, are reviewed with reference to the accompanying figures.

Basic Binary Cellular Automata

A one-dimensional binary cellular automaton (CA) consists of a linearly connected array of L cells, each of which takes the value 0 or 1, and a Boolean function f(x) with q variables. The value of the cell $x_i$ is updated in parallel (synchronously) using this function in discrete time steps as $x'_i = f(x)$ for i=1, 2, ..., L. The boundary conditions are usually handled by taking the index value module L. The parameter q is usually an odd integer, i.e., q=2r+1, where r is often named the radius of the function f(x); the new value of the ith cell is calculated using the value of the ith cell and the values of r neighboring cells to the right and left of the ith cell.

Since there are L cells, each of which takes the values of 0 or 1, there are $2^L$ possible state vectors. Let $S_k$ denote the state vector at the time step k. Starting from an initial state vector $S_0$, the cellular automaton moves to the states $S_1$, $S_2$, $S_3$ etc., at time steps k=1; 2; 3; ... etc. The state vector $S_k$ takes values from the set of L-bit binary vectors as k advances, and the state machine will eventually cycle, i.e., it will reach a state $S_{k+P}$ which was visited earlier $S_k = S_{k+P}$. The period P is a function of the initial state, the updating function, and the number of cells.

For a CA with q=3, the evolution of the ith cell in each discrete time step t (clock cycle) can be represented as a function of the present state of the (i−1)th, (i)th, and (i+1)th cells as $$x_i(t+1) = \{f(x_{i-1}(t), x_i(t), x_{i+1}(t)\} \quad (1)$$

f is also called the combinatorial logic associated with the CA. Each combinatorial logic represents an updating rule for evolving to the next state.

If the next state function of a cell is expressed in the form of a truth table, then the decimal equivalent of the output column in the truth table is conventionally called a CA rule number. A nonlinear rule, called Rule 30, proposed and considered in Non-Patent Document 3, realizes updating according to the following:

$$x_i(t+1) = x_{i-1}(t) \text{ XOR } [x_i(t) \text{ OR } x_{i+1}(t)] \quad (2)$$

Of particular interest are two linear rules over GF(2). These are known as Rule 90 and Rule 150 respectively. Rule 90 specifies an evolution (updating) from current to the next state according the following combinatorial logic:

$$x_i(t+1) = x_{i-1}(t) \oplus x_{i+1}(t) \quad (3)$$

where ⊕ denotes XOR operation. Note that when Rule 90 is applied the next state of the ith cell depends on the present state of its left and right neighbors. Similarly, the combinatorial logic for Rule 150 is given by:

$$x_i(t+1) = x_{i-1}(t) \oplus x_i(t) \oplus x_{i+1}(t) \quad (4)$$

that is, the next state of the ith cell depends on the present states of its left and right neighbors and also on its own present state.

If in a CA the same rule applies to all cells, then the CA is called a uniform CA; otherwise it is called a hybrid CA. There can be various boundary conditions; namely, null (where extreme cells are connected to logic "0"), periodic (extreme cells are adjacent), etc.

Background on CA can be found in Non-Patent Document 2.

2-by-L Cellular Automata 2-by-L CA have been proposed and considered in Non-Patent Document 4, and this section summarize certain characteristics of 2-by-L CA.

Recall that, a linear finite state machine (LFSM) is comprised of L single-bit memory elements and a transition function. The value or state of the ith memory element at time t is denoted $s^t_i$. The state of LFSM at time t is denoted $s^t$. The transition function f determines the state of LFSM at time t+1 from the state at time t; that is $s^{t+1} = f(s^t)$. The next state function of an LFSM can be described graphically using a state graph. Note that linearity of an LFSM means that f is a linear function from n-bit vectors to n-bit vectors; that is, $$f(a+b) = f(a) + f(b),$$

for any two states a and b. The transition function f can be specified as n functions $f_1, f_2, \ldots f_n$, where the ith function calculates the next state of cell i:

$$s_i^{t+1} = f_i(s^t).$$

In the context of CA, the function $f_i$ is called the cell rule for cell i. The transition function f is linear if and only if each of the $f_i$ are linear. For simplicity, s is used to denotes the present state and $s^+$ for the next state. Similarly, $s_i$ denotes the present state and $s_i^+$ the next state of cell i. In a CA, communication between cells is nearest-neighbor, meaning that each cell is connected to only its immediate neighbors. FIG. 1 shows the interconnection structure of 2-by-1 CA. The leftmost and rightmost cells are assumed to have a constant-0 input on their left and right inputs, respectively (omitted in the picture). Such CA are called 2-by-1 CA with regular configuration.

At each time step, each cell calculates a new state using its cell rule. Different cells can use different rules, making the CA hybrid. Also it is assumed that the CA are fully connected, meaning that each cell receives input from all three of its neighbors. As a consequence, the cell rule $f_i$ for cell i must be one of the following:

$$f_i(s_l, s_r, s_v, s_s) = s_l \oplus s_r \oplus s_v \text{ if the cell uses rule-zero} \quad (5)$$

$$f_i(s_l, s_r, s_v, s_s) = s_l \oplus s_r \oplus s_v \oplus s_s \text{ if the cell uses rule-one} \quad (6)$$

where $s_l$ ($s_r$) denotes the present state of the left (right) neighbor, $s_v$ denotes that of the vertical neighbor, and $s_s$ the state of cell i itself. The rule-zero and rule-one are natural generalizations of the rule 90 and rule 150, respectively, that appear in the one-dimensional CA literature of the related art.

Since there are only two rules, the rule used by a cell can be encoded as a single bit, i.e., "1" denotes rule-one and "0" denotes rule-zero. We use the variables $t_1, t_2, \ldots, t_L$ and $b_1, b_2, \ldots, b_L$ to indicate the rules used by the cells. For simplicity, the top cells are numbered from 1 to L corresponding to $t_1, t_2, \ldots, t_L$ and the bottom cells from L+1 to 2L corresponding to $b_1, b_2, \ldots, b_n$. In general, a rule vector $[[t_1, t_2, \ldots, t_n], [b_1, b_2, \ldots, b_n]]$ is used to identify a given 2-by-1 CA.

The transition matrix T of an LFSM defines the transition function algebraically, so that $s^+ = s \cdot T$. The transition function of an one-dimensional CA is tridiagonal. For 2-by-1 CA, the transition matrix has the block structure $$T = \begin{bmatrix} T_1 & I \\ I & T_2 \end{bmatrix} \quad (7)$$

where $T_1$ and $T_2$ are L-by-L tridiagonal matrices and I is an L-by-L identity matrix. For example, the transition matrix for a 2-by-4 CA is $$T = \begin{bmatrix} t_1 & 1 & 0 & 0 & 1 & 0 & 0 & 0 \\ 1 & t_2 & 1 & 0 & 0 & 1 & 0 & 0 \\ 0 & 1 & t_3 & 1 & 0 & 0 & 1 & 0 \\ 0 & 0 & 1 & t_4 & 0 & 0 & 0 & 1 \\ \hline 1 & 0 & 0 & 0 & b_1 & 1 & 0 & 0 \\ 0 & 1 & 0 & 0 & 1 & b_2 & 1 & 0 \\ 0 & 0 & 1 & 0 & 0 & 1 & b_3 & 1 \\ 0 & 0 & 0 & 0 & 0 & 0 & 0 & b_4 \end{bmatrix} \quad (8)$$

where the $t_i$ and $b_i$ ($1 \leq i \leq 4$) are defined as above. Note that the transition matrix of any 2-by-1 CA is symmetric.

Consider an example of a 2-by-3 CA, and assume the CA uses a rule vector [[1, 1, 0], [0, 0, 1]] so that, $[t_1, t_2, t_3] = [1,1,0]$ and $[b_1, b_2, b_3] = [0,0,1]$ Let $s_i$ ($1 \leq i \leq 6$) be the present $s_1^+ = s_1 \oplus s_2 \oplus s_4$ $s_2^+ = s_1 \oplus s_2 \oplus s_3 \oplus s_5$ $s_3^+ = s_2 \oplus s_6$ $s_4^+ = s_1 \oplus s_5$ $s_5^+ = s_2 \oplus s_4 \oplus s_6$ $s_6^+ = s_3 \oplus s_5 \oplus s_6$ Minimal-Cost 2-by-L CA For any application, in general, it is desirable to attempt to minimize the hardware cost of the LFSM implementation. In a similar fashion as for 1D CA, the minimal cost 2-by-1 CA of even degree up to 500 are calculated and reported in Non-Patent Document 4. Note that, minimizing the hardware cost means minimizing the number of cells that use rule-one, since rule-one has a slightly higher complexity both for evaluation and for implementation.

The algorithm proposed in Non-Patent Document 4 to determine whether a given 2-by-1 CA has a maximum length cycle is as follows:
1. Compute the characteristic polynomial of the CA using the recurrence relation in Theorem 1 described in Non-Patent Document 4,
2. Check if the characteristic polynomial is primitive, if so, the CA has the maximum length cycle.

Accordingly, for each n ($1 \leq n \leq 250$), the algorithm first generates and check the uniform rule-zero CA. If this is not successful (which it never is), the algorithm generates all 2-by-n CA with a single rule-one cell. If this is not successful, the algorithm then generates all of the CA that have a pair of rule-one cells, and so on. For each n, the search was stopped at the first 2-by-n CA with the maximum length cycle. Consequently, the CA generated has the minimal cost, i.e., use the fewest number of rule-one cells. Results of the algorithm are shown in Table 3 of Non-Patent Document 4.

Note that, for L=2 and L=4, there does not exist 2-by-n CA with a maximum length cycle. The structure of a 2-by-2 CA is the same as a cyclic linear hybrid CA, so it is not surprising that there are no maximal length machines.

The results computed in Non-Patent Document 4 lead to two observations concerning uniform and weight-1 CA. A CA is uniform if all cells use the same rule. Such CA are called rule-zero CA if all cells use rule-zero or rule-one CA if all cells use rule-one. A weight-1 CA has a single cell using rule-one, with all other using rule-zero. The observations reported in Non-Patent Document 4 are:
Observation 1. There does not exist a maximal length uniform CA.
Observation 2. There does not exist a maximal length weight-1 CA for L>1.

Apparatus and Method According to the Present Embodiment

First, a method according to the first embodiment for generation of pseudorandom sequences with controllable period is described.

Suppose that the binary sequences $\{a_i\}_i$ and $\{b_i\}_i$ are realizations of two independent processes, and that the following is valid.

The process which generates sequence $\{a_i\}_i$ provides that this sequence has desirable randomness properties measured by a system of statistical tests and at least moderate period estimated via the experiments.

The process which generates sequence $\{b_i\}_i$ provides that this sequence has at least moderate randomness properties measured by a system of statistical tests and large period which value is analytically provable.

Then, the inventor of the present application finds that, the following statement holds:

The sequence $\{c_i\}_i = \{a_i \oplus b_i\}_i$ has desirable randomness properties measured by a system of statistical tests and large period which value is analytically provable.

According to the above finding, there is provided the following method for generating binary sequences with highly randomness characteristics and controllable period, the method including the following steps:
(1) Employ appropriate cellular automata based approach and specify an algorithm for generating the binary sequences with desired randomness characteristics and moderate (at least) length of expected period;
(2) Employ appropriate cellular automata based approach and specify an algorithm for generating the binary sequences with desired period and moderate (at least) randomness characteristics;
(3) Generate the resulting sequence as a bit-by-bit mod2 sum of the above two component sequences; the expected characteristics of the resulting sequence are: desired statistical characteristics and controllable lower bound on the sequence period.

Next, an example of an apparatus according to the first embodiment for generation of pseudorandom sequences with controllable period is described. There are three main building components for the apparatus for generation of pseudorandom sequences with controllable period. Those are:
2-by-L CA displayed in FIG. 1, and specified in the above-described Section and Table 1;
2D-CA displayed in FIG. 2 and specified based on Table 2 (see the above-described Section for the details); and adder for a bit-by-bit mod2 sum of resulting sequences of the 2-by-L CA and 2D-CA.

TABLE 1

| L | 2-by-l CA description |
|---|---|
| 3 | 1, 2, 6 |
| 32 | 8, 13 |
| 64 | 1, 4, 46 |
| 96 | 5, 10 |
| 128 | 2, 226 |

TABLE 2

| rule 15 | $s_{i,j}(t+1) = s_{i-1,j}(t) \oplus s_{i,j-1}(t) \oplus s_{i+1,j}(t) \oplus s_{i,j+1}(t)$ |
|---|---|
| rule 31 | $s_{i,j}(t+1) = s_{i-1,j}(t) \oplus s_{i,j-1}(t) \oplus s_{i+1,j}(t) \oplus s_{i,j+1}(t) \oplus s_{i,j}(t)$ |
| rule 47 | $s_{i,j}(t+1) = 1 \oplus s_{i-1,j}(t) \oplus s_{i,j-1}(t) \oplus s_{i+1,j}(t) \oplus s_{i,j+1}(t)$ |
| rule 63 | $s_{i,j}(t+1) = 1 \oplus s_{i-1,j}(t) \oplus s_{i,j-1}(t) \oplus s_{i+1,j}(t) \oplus s_{i,j+1}(t) \oplus s_{i,j}(t)$ |

Table 1 specifies a plurality of particular 2-by-L CA. The entries in the table indicate which cells use rule-one. For example, the entry 3 1, 2, 6 represents a rule vector for a 2-by-3 CA, i.e., the CA of 6 cells with rule vector $$[[t_1,t_2,t_3],[b_1,b_2,b_3]]=[[1,1,0],[0,0,1]]$$

where "1" denotes rule-one in cells 1, 2, and 6.

The apparatus employs particular 2D-CA, reported in Non-Patent Document 1, which generates a high quality pseudorandom sequences. It consists of 64 cells arranged in a two-dimensional (2D) 8×8 array.

Let $s_{i,j}$ (t) denotes a cell state of 2D-CA with the coordinates (i, j), at a time instant t, i, j=1, 2, . . . , 8. In the employed 2D-CA, a cell is updated according to one of the rules given in Table 2. The employed 2D-CA is displayed in FIG. 2.

Figure 3:
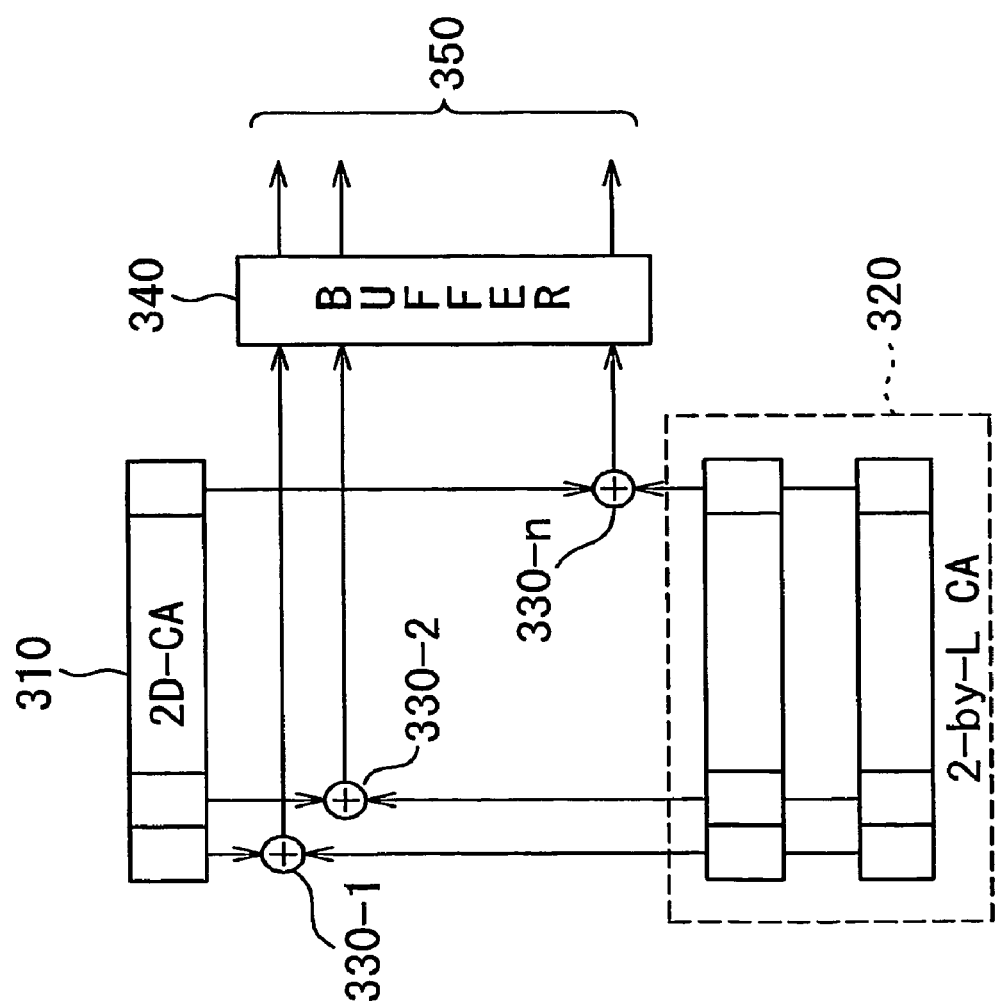
FIG. 3 is a schematic diagram showing an example structure of pseudorandom sequence generator in accordance with a first embodiment of the present invention.

FIG. 3 shows a configuration example of the apparatus according to the first embodiment of the present invention. The apparatus has a 2D-CA 310, a 2-by-L CA 320, adders 330-1, 330-2, . . . , 330-*n* for performing bit-by-bit mod2 additions of 2D-CA cell outputs and corresponding 2-by-L CA cell outputs, and a buffer 340 for buffering results of the mod2 addition operation to output generated high quality pseudorandom sequences 350 with controllable period. Here, high quality pseudorandom sequence means a sequence which passes a specified set of statistical tests which measures the sequence randomness.

The apparatus may be realized with a computer with a CPU and a memory by causing the computer to execute a predetermined program, or hardware logic devices.

The apparatus displayed in FIG. 3 works as follows.

Initialization: Initialize all the cells employing a sequence of independent random bits.

Sequence Generation: Each cycle of the apparatus consists of the following steps.

(1) Run one cycle of the 2-by-L CA 320 updating all its cells.

(2) Run one cycle of the 2D-CA 310 updating all its cells.

(3). Perform bit-by-bit mod2 addition of 2D-CA 310's cells and corresponding 2-by-L CA 320's cells.

The following Table 3 illustrates typical values of the apparatus' space complexity and the obtained lower bound on the output sequence period.

TABLE 3

| number of employed CA cells | lower bound on period of output sequence |
|---|---|
| 128 | $2^{64}$ |
| 160 | $2^{96}$ |
| 160 | $2^{96}$ |

Second Embodiment

According to a second embodiment of the present invention, a family of building blocks for stream ciphers design is provided. Main role of these building blocks is to generate pseudorandom sequences suitable for further processing. These sequences have highly randomness characteristics, huge period, and are practically unpredictable. The building blocks of the present embodiment are based on three different classes of cellular automata combined in a manner which yields the desired characteristics of the output pseudorandom sequences. The family of the present embodiment yields possibility for selection of certain family members suitable for wide range of particular implementation or application constraints.

Developing of appropriate basic building blocks for stream ciphers is a well recognized and an open problem. Very recently a novel contribution to this topic has been reported in Non-Patent Document 5 where cryptographic building blocks based on T-functions have been studied.

However, it is desirable to provide different approach to address the problem, thereby providing a user or a system designer more flexible means for generating pseudorandom sequences. For example it is desirable to provide a novel framework for obtaining suitable building blocks for stream ciphers based on employment of cellular automata. Before describing the present embodiment in detail, some of basic technologies of CCA which are employed in the present embodiment are described.

Controllable Cellular Automata (CCA)

This section yields an overview of the Controllable Cellular Automata (CCA) introduced in Non-Patent Document 6 where a more in detail consideration can be found. To explain CCA, several issues are defined first to identify the CCA properties.

Definition: A CCA is a CA in which the action (how the state of a cell is updated in each cycle) of some cells can be controlled via cell control signals. Similar to rule control signals, cell control signals can be stored in ROM or generated by a CA.

Definition: If a cell is under the control of cell control signal, it is a controllable cell; otherwise, it is a basic cell. CCA is the combination of controllable cells and basic cells. Both controllable cells and basic cells could have rule control signals.

The action of a controllable cell is determined by its current cell control signal. A controllable cell can be normal (when the cell control signal is 0) or activated (when the cell control signal is 1). When the controllable cell is normal, the computation of the states of the controllable cell and its neighbors is as usual (according to the current rule control signals and the states of its neighbors). When the controllable cell is activated, the computation of the states of the controllable cell and its neighbors is specified by some predefined actions. The actions applied to the controllable cell and its neighbors could be different. It is observed that the predefined actions affect the state computation of controllable cells.

The structure of a CCA has L cells in total. M (M≦L) cells are controllable cells and the remaining cells are basic cells. Here, all the basic cells are programmable cells. Thus, in this CCA, there are rule control bits and cell control bits. Compared to an L-cell programmable CA (PCA), which has rule control bits, the extra cost of CCA is the M cell control bits. During the CA transition, the rule control signals will decide which rule to be employed on both basic and controllable cells; the cell control signals will decide the status of controllable cells.

The usage of controllable cells in a CCA differentiates it from a Programmable CA (PCA), in which only rule control signals exist. Once the actions of controllable cells and basic cells are specified, the setting of controllable cells will decide the performance of CCA. The common idea in PCA and CCA is that they both use some control lines on the CA cells to make the CA transition more unpredictable and flexible. The difference is that in PCA, all the cells have uniform structures, while obviously in CCA, the structure of controllable cells are not the same as that of basic cells.

To achieve similar CA performance, other methods may be used. For example, increasing the radius (i.e., number of neighbors), using more states in each cell, or evolving the rule tables for each cell. It is hard to say which method is better in performance or hardware design since their costs are not comparable. Instead of evolving rule tables, it is proposed a scheme to control the status of CA cells so that different computation approaches could be applied when a cell status changes. Based on this, new class of CA-CCA is proposed in Non-Patent Document 6, capable of changing cell status on the fly. The work was then focuses on finding good configurations of CCA that can obtain good randomness quality.

In the following, two controllable cell types are proposed, and they are used as examples of CCA to further study their performance.

As described above, when the cell control signal is zero, a controllable cell acts the same as a basic cell, while when the cell control signal is one, the controllable cell performs some predefined action, which can be different from the action it performs when it is normal. This means that the action a controllable cell performs when it is activated decides the property of controllable cell.

The simplest action that an activated controllable cell can take is to keep its state during the CA computation process. In the mean time, the states of its neighbors are computed as usual. This type of controllable cell is called a Type 0 controllable cell. A CCA that is a combination of Type 0 controllable cells and basic cells is henceforth referred to as CCA0.

A Type 2 controllable cell is found when a controllable cell is activated, and it keeps its latest state, while its neighbors will bypass it. This means the activated controllable cell will not be involved in the sate computation of its neighbors. In this way, the neighborhood relationship is changed dynamically during the CA computation process. A CCA that is a combination of Type 2 controllable cells and basic cells is referred to as CCA2 or neighbor-changing CA (NCA). CCA 2 cannot be simulated by any PCA due to its neighbor-changing behavior.

Apparatus and Method According to the Present Embodiment

The underlying ideas for design of a novel building block family according to the present embodiment for, for example, stream ciphers include the following.

(1) Employment of certain recently reported results on cellular automata and CA based pseudorandom number generators which yield background for controlling the following two characteristics of the building block output sequences: statistical characteristics (randomness), period (2) Providing unpredictability of the building block output sequence via employment of a time varying algorithm for its generation, and particularly providing the following:

Resistance against reported and improved fast correlation attacks (see for example, Non-Patent Document 8) and algebraic attacks (see for example, Non-Patent Document 9).

The building block consists of certain parts, and each of them contribute to one or two of the following items, i.e., long period, good statistics and unpredictability.

In the design according the present embodiment, cellular automata are employed as the basic components. The following recent reports related to CA are considered.

Non-Patent Documents 1 and 6 point out CA structures 2D-CA (2-Dimensional Cellular Automata) and CCA (Controllable Cellular Automata) that generate highly random binary sequences that can pass a large number of statistical tests enumerated in Table 4 disclosed in Non-Patent Document 11, which known as DIEHARD Test Collection.

The results reported in Non-Patent Document 4 points out CA structures which generate maximal period sequences with analytical provability (see the above-described Section, as well).

TABLE 4

| index number | Test Name | Grading |
|---|---|---|
| 1 | Overlapping Sum | a pass is |
| 2 | Runs up 1 | considered when |
|  | Runs Down 1 | the p-value |
|  | Runs up 2 | is not 0 or 1 |
|  | Runs Down 2 |  |
| 3 | 3D Sphere |  |
| 4 | A Parking Lot |  |
| 5 | Birthday Spacing |  |
| 6 | Count the Ones 1 |  |
| 7 | Binary Rank 6*8 |  |
| 8 | Binary Rank 31*31 |  |
| 9 | Binary Rank 32*32 |  |
| 10 | Count the Ones 2 |  |
| 11 | Bitstream Test |  |
| 12 | Craps Wins |  |
|  | Craps Throws |  |
| 13 | Minimum Distance |  |
| 14 | Overlapping Permutation |  |
| 15 | Squeeze |  |
| 16 | OPSO Test |  |
| 17 | OQSO Test |  |
| 18 | DNA Test |  |
| 18 | Overall KS Test |  |

Figure 2:
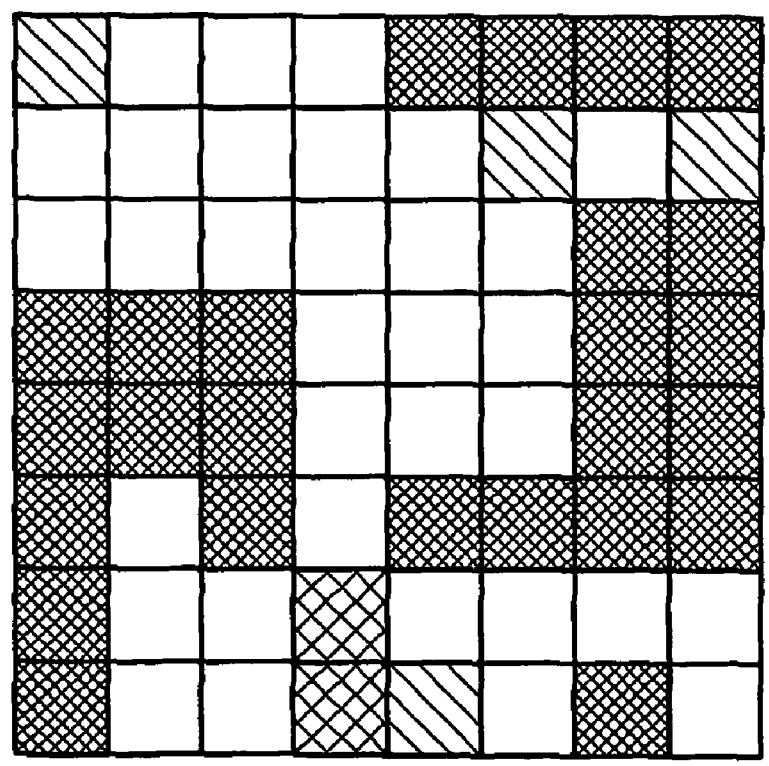
FIG. 2 is a schematic diagram showing an example of two-dimensional Cellular Automata (2D-CA).
Figure 2:
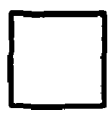
Figure 2:
Figure 2:
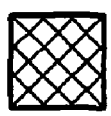
Figure 2:
Figure 4:
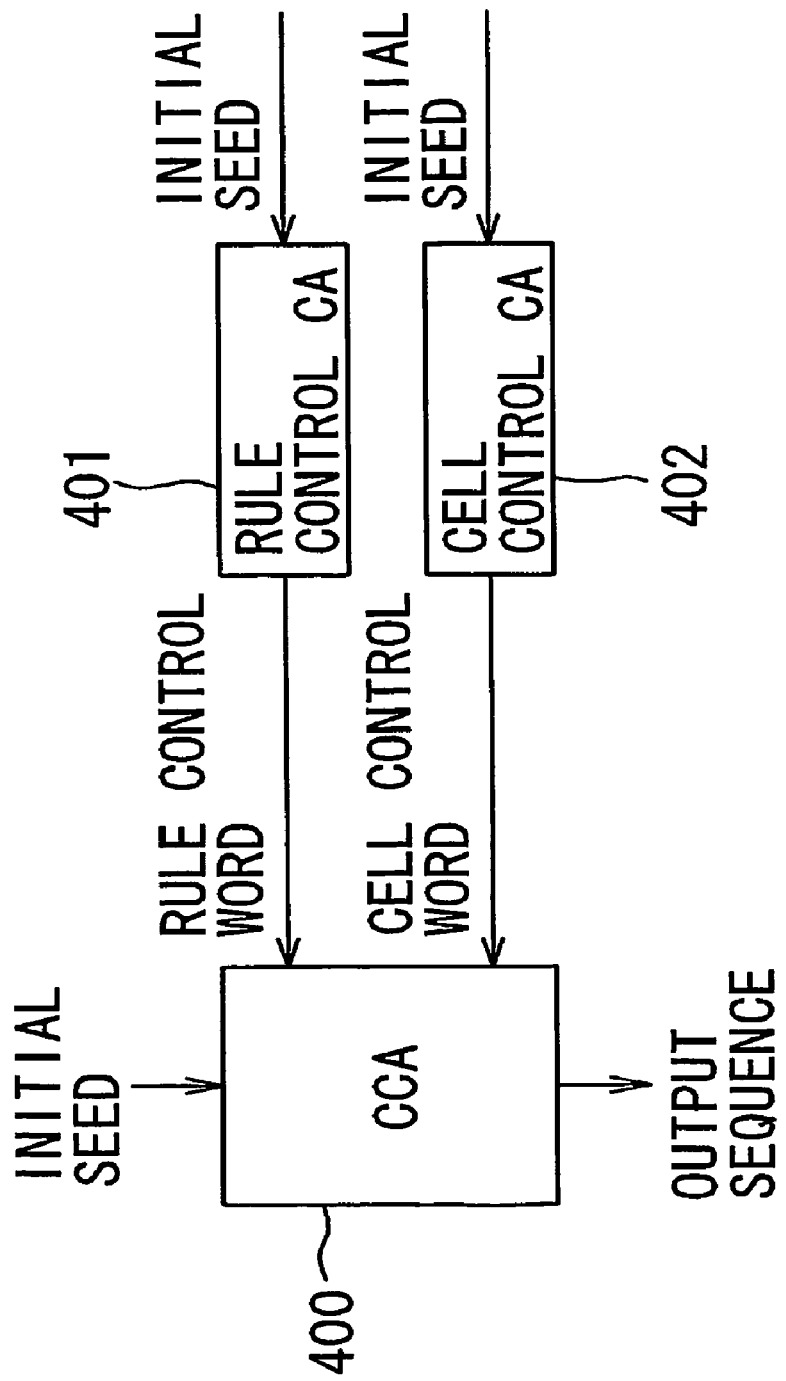
FIG. 4 is a schematic diagram showing an example of macro block structure of Controllable Cellular Automata (CCA).
Figure 5:
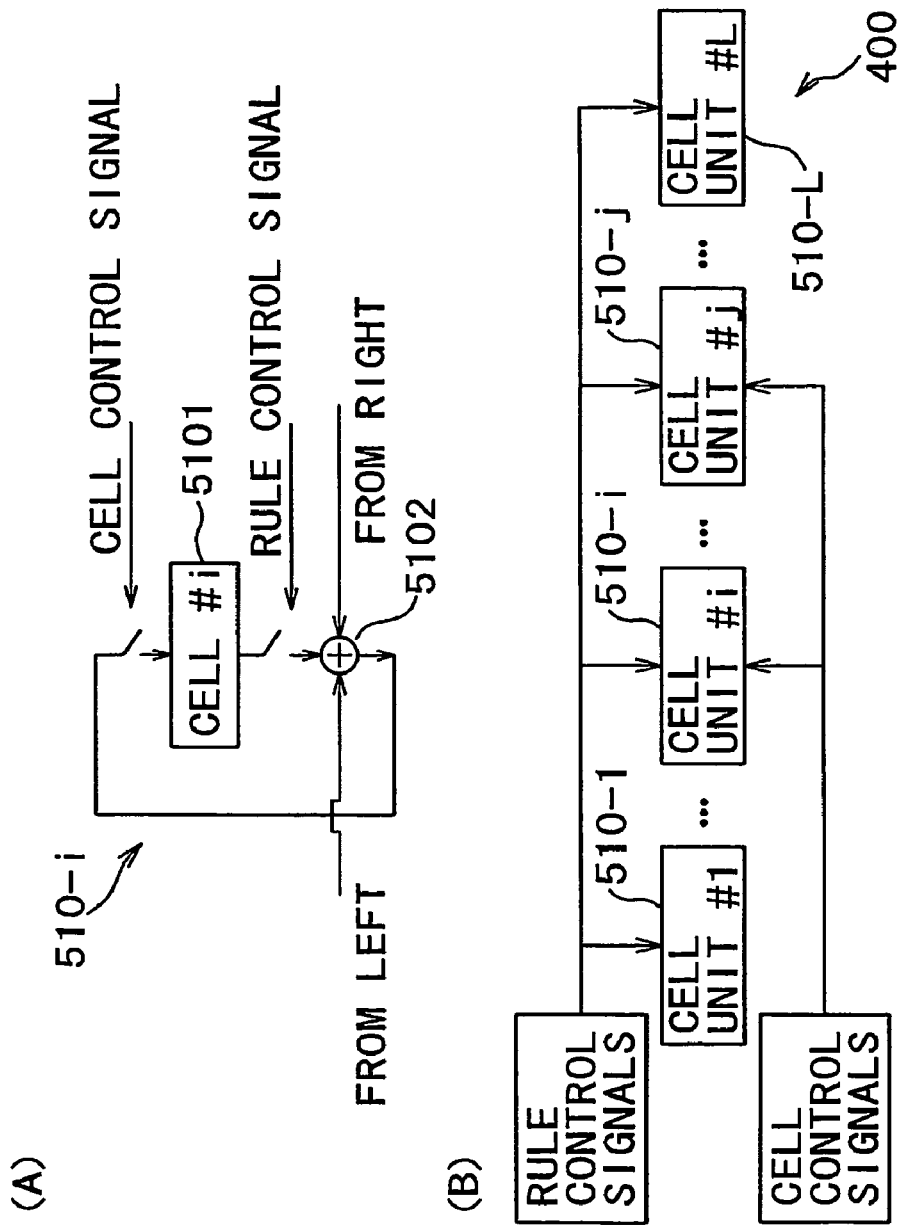
FIG. 5 is a schematic diagram showing structural examples of components in CCA.

In the present embodiment, the following three main components may be employed for the building block:

2-by-L CA displayed in FIG. 1 and specified in the description of the first embodiment with particular examples given in Table 1;

2D-CA displayed in FIG. 2 and specified in the description of the first embodiment based on Table 2;

CCA displayed in FIGS. 4-5 and specified in Table 5; and adder for a bit-by-bit mod2 sum of resulting sequences of the 2-by-L CA, 2D-CA and

CCA.

TABLE 5

| cell index interval | 1-10 | 11-20 | 21-30 | 31-40 | 41-50 | 51-60 | 61-64 |
|---|---|---|---|---|---|---|---|
| cell updating rule | 0110101111 | 0010110001 | 1100101011 | 1101111011 | 1100110001 | 0001000000 | 1111 |
| cell outputting rule | 0000111110 | 0000011010 | 1111100010 | 0101100111 | 1001010111 | 1000110111 | 1101 |

The employed CCA structure, obtained by an optimization (evolutionary multi objective optimization—EEOO) algorithm, and reported in Non-Patent Document 6 as one with the best statistical characteristics is specified in Table 5. In the second row of Table 5, "1" denotes a controllable cell, and in the third row, "1" denotes a cell which contribute to the CCA output.

FIG. 4 shows an example of an overall block structure including CCA in the apparatus of the present embodiment. FIG. 5(B) shows an example of an internal structure of the CCA, and FIG. 5(A) shows an example of a structure of a cell unit that constitutes the CCA.

As shown in FIG. 4, in the present embodiment, it is assumed that the rule control signals (rule control word) and cell control signals (cell control word) for a CCA 400 are generated by two CAs 401, 402 separately. The CA 401 generating rule control signals is called as a rule control CA. The CA 402 generating cell control signals is called as a cell control CA.

As shown in FIG. 5(B), the CCA 400 contains a plurality of cell units 510-1, ..., 510-i, ..., 510-j, ..., and 510-L. In the instant example, it is assumed that the CCA 400 has L cells in total, M (M≦L) cells are controllable cells (for example, cell unit 510-i, 510-j), and the remaining cells are basic cells (for example, 510-1, 510-L). The controllable CA cell unit has, for example as shown in FIG. 5(A), a cell 5101, the state of which is controlled by the cell control signal and the rule control signal, and an adder 5102 for inputting the states of its neighbor cells in right and left.

Here, all the basic cells are programmable cells. Thus, in this CCA, there are rule control bits and cell control bits. Compared to an L-cell programmable CA (PCA), which has rule control bits, the extra cost of CCA is the M cell control bits. During the CA transition, the rule control signals will decide which rule to be employed on both basic and controllable cells; the cell control signals will decide the status of controllable cells.

In each cycle, the bit combination of rule (cell) control signals for the CCA cells is termed the rule (cell) control word. The length of rule control word is the same as that of the CCA 400, while the length of cell control word is decided by the number of controllable cells in the CCA 400.

The running sequence of the CCA 400 is described as the following. Initial seeds and transition rules are input to the rule control CA 400, the cell control CA 402, and the CCA 400 to initialize them. The two control CAs 401, 402 run synchronously with the CCA 400 to generate the rule and cell control words for the CCA cells. In each cycle, the previous states of CCA cells plus the rule/cell control words decide CCA cells current states. The current states of some CCA cells are recorded in every cycle as the output bit sequence.

Because considerable work has been done on the searching for good transition rules in PCA, Non-Patent Document 6 has followed the recommended choice of rules. The four additive rules used in Non-Patent Document 6 are rules 90, 150, 105, and 30. Rules 90 and 150 are used as the transition rules in CCA; this is to facilitate the comparison with 1-bit PCA 90150. Rule 30 is used in the rule control CA and rule 105 is used in the cell control CA since these two rules are said to be among the best ones in random number generation according to Non-Patent Document 7. It should be noted that, in the employed CCA (CCA2) described in Non-Patent Document 6 with 64 cells, there are 35 controllable cells and 35 output cells, in which 20 are controllable cells.

According to the present embodiment of the present invention, there is provided an apparatus including a family of the building blocks (3-CA) described above. The apparatus generates practically unpredictable high quality pseudorandom sequences with controllable period.

Figure 6:
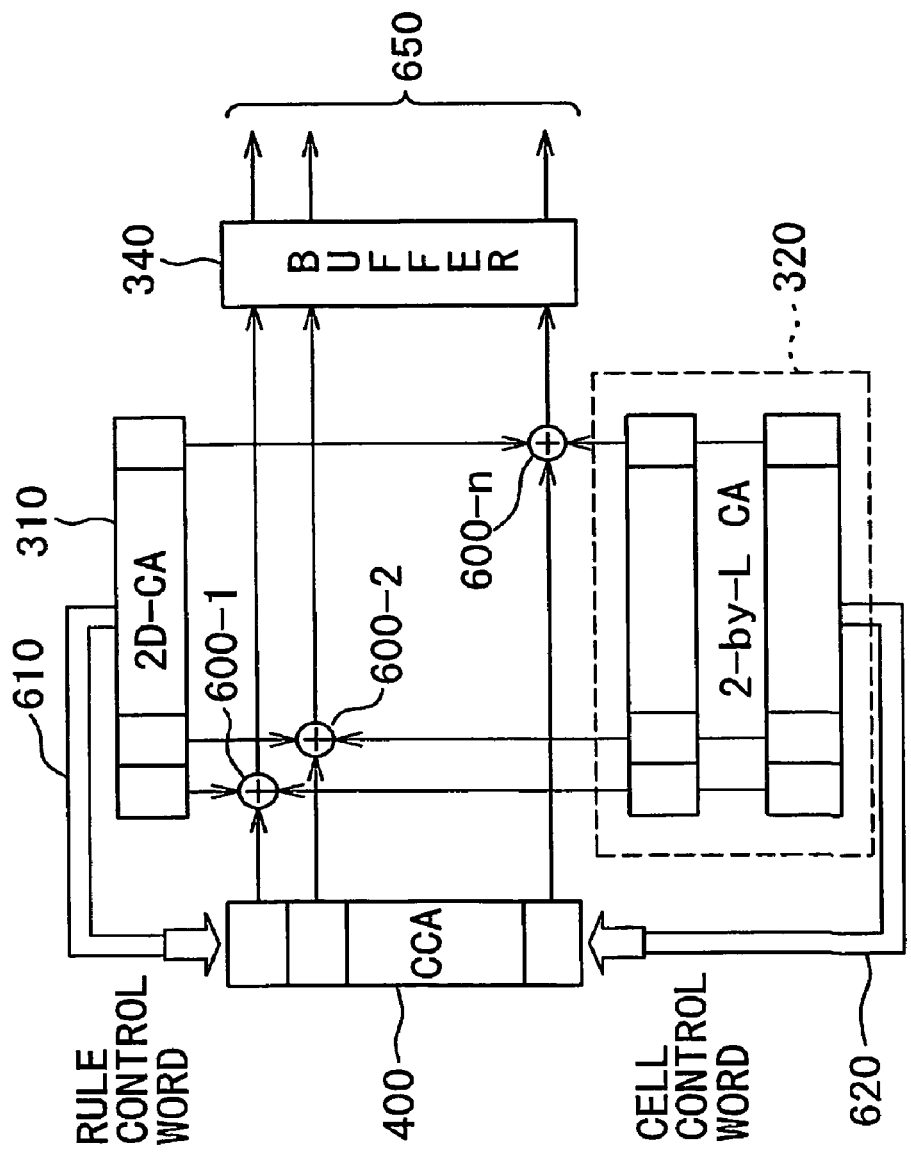
FIG. 6 is a schematic diagram showing an example structure of pseudorandom sequence generator in accordance with a second embodiment of the present invention.

The apparatus with a typical 3-CA building block is displayed in FIG. 6. The apparatus has a 2D-CA 310, a 2-by-L CA 320, the CCA 400, adders 600-1, 600-2, ..., 600-n for performing bit-by-bit mod2 additions of corresponding cell outputs from the 2D-CA 310, 2-by-L CA 320 and the CCA 400, and a buffer 340 for buffering results of the mod2 addition operation to output generated high quality pseudorandom sequences 650.

Further, in the apparatus of the present embodiment, the 2D-CA 310 and the 2-by-L CA 320 serves as the rule control CA 401 and the cell control CA 402, respectively. In other words, a rule control word 610 and a cell control word 620 are generated respectively from the 2D-CA 310 and the 2-by-L CA 320, and supplied to the CCA 400 for the cell and rule control as shown in FIGS. 4 and 5.

The apparatus displayed in FIG. 6 works as follows.

Initialization: Initialize all the cells employing a sequence of independent random bits.

Sequence Generation: Each cycle of the apparatus with the 3-CA structure includes the following steps:
(1) Run one cycle of 2-by-L CA for updating all its cells;
(2) Run one cycle of 2D-CA for updating all its cells;
(3) Specify the CCA rule control word based on 2D-CA cells;
(4) Specify the cell control word-based on 2-by-L CA cells;
(5) Run one cycle of CCA for updating all its cells; and
(6) Perform bit-by-bit mod2 addition of corresponding CCA, 2D-CA and 2-by-L CA cells.

Table 6 illustrates an example of the building block space complexity measured by the total number of employed CA cells and the obtained lower bound on the output sequence period.

TABLE 6

| number of employed CA cells | lower bound on period of output sequence |
|---|---|
| 128 | $2^{64}$ |
| 256 | $2^{128}$ |

Third Embodiment

In a third embodiment of the present invention, a family of cryptographic pseudorandom sequence generators (keystream generators) are provided for stream ciphers design and related applications. The family of the present embodiment yields at the same time high efficiency and security. The keystream generators of the present embodiment yield sequences with highly randomness statistical characteristics, huge period and which are practically unpredictable.

The keystream generators of the present embodiment are based on three different classes of cellular automata, nonlinear mapping based on Latin squares, and employment of nonuniform decimation combined in a manner which yields the desired characteristics of the output pseudorandom sequences.

Developing of appropriate cryptographic pseudorandom sequence generators or keystream generator for stream ciphers is a well recognized and an open problem. A number of underlying components and keystream generators have been reported in the literature of the related art. Some of the reported schemes are based on cellular automata (CA).

Cellular automata (CA) were originally proposed by von Neumann in the early 1950s to explore self-replicating structures. The increasing interests in CA based Pseudo Random Number Generators (PRNGs) may be due to their simple and cascade structures. CA are regular, locally interconnected, and modular. These characteristics make CA easier to implement in hardware than other models. CA can generate random sequences either sequentially or in parallel. In practice, most CA produce sequences in parallel to obtain higher output efficiency.

A cellular automaton is an array of cells where each cell can be in any one of its permissible states. At each discrete time step (clock cycle) the change of a cells state depends on its transition rule, which is a function of the present states of its k neighbors for a k-neighborhood CA. A cellular array (grid) is n-dimensional, where n=1, 2, 3 is used in practice. A CA having a combination of XOR and XNOR rule is called an additive CA (Non-Patent Document 3). If all the CA cells obey the same rule, then the CA is said to be uniform; otherwise, it is nonuniform or hybrid (Non-Patent Document 7). A CA is said to be a periodic boundary CA (PBCA) if the extreme cells (the first and last cells) are adjacent to each other. A CA is said to be a null-boundary CA if the extreme cells are connected only to its left (right) cell (Non-Patent Document 3).

Additive Cellular Automata

A very important class of CA are linear CA in GF(2) or additive CA. If the next-state generating logic employs only XOR or XNOR operations, then the CA is said to be an additive CA. Linear CA is a special form of Linear Finite State Machines (LFSM's). Every LFSM is uniquely represented by a transition matrix over GF(2), and every transition matrix has a characteristic polynomial.

For an L-cell one-dimensional additive CA with XOR operations only, it has been shown in Non-Patent Document 12 that the CA can be characterized by a linear operator denoted by T which is an L×L Boolean matrix and whose ith row specifies the neighborhood dependency of the ith cell. The next state of CA is generated by applying this linear operator on the present CA state represented as a column vector. The operation is the normal matrix-multiplication, but the addition involved is module-2 sum. If x(t) is a column vector representing the state of the automaton at the tth instant of time, then the next state of the automaton is given by:

$$x(t+1) = T \times x(t)$$

If the characteristic polynomial of a CA is primitive, then it is referred to as a maximal length CA. Such an L cell CA generates all $2^L-1$ states in successive cycles excluding the all zero state.

Since, for a fixed order L, there are $2^{L2}$ transition matrices (and hence $2^{L2}$ LFSM's) but only $2^L$ degree L polynomials, there is the following situation: There is a one-to-one correspondence between L-cell LFSM and L×L matrices, and at the same time a many-to-one correspondence between the transition matrices and the polynomials of degree L.

The characteristic polynomial of an LFSM is never difficult to obtain, as it can be calculated by evaluating a determinant. On the other hand, finding a particular type of LFSM (such as a CA) with a specific characteristic polynomial is a problem solved in Non-Patent Document 13 where a method is presented for obtaining a CA that has a given characteristic polynomial. The same method can also be used to solve the problem as to whether a CA exists for each irreducible polynomial.

Programmable Cellular Automata

Positional representations of Rule 90 and Rule 150 show that their neighborhood dependence differ in only one position, viz., on the cell itself. Therefore, by allowing a single control line per cell, one can apply both Rule 90 and Rule 150 on the same cell at different time steps. Thereby, an L cell CA structure can be used for implementing $2^L$ CA configurations. Realizing different CA configurations (cell updating rules) on the same structure can be achieved using a control logic to control the appropriate switches and a control program, stored in ROM, can be employed to activate the control. The 1(0) state of the ith bit of a ROM word closes (opens) the switch that controls the ith cell. Such a structure is referred to as a programmable cellular automaton (PCA).

Accordingly, allowing one control input per cell that configures the updating rule, it is possible to apply to that cell, either Rule 90 or Rule 150. The n-bits control word for an n cells PCA has 0(1) on the ith cell if Rule 90(150) is applied to the ith cell.

Cellular Automata Based Pseudorandom Number Generators

CA pseudorandom number generators (PRNGs), to which the present embodiment is applied, have been an active research field. Non-Patent Document 3 has shown that the randomness of patterns generated by maximum-length CA was significantly better than other widely used methods, such as linear feedback shift registers (LFSR).

In a plurality of papers, one-dimensional (1-d) CA PRNGs as well as certain PCA were discussed. However, the randomness quality even of 1-d PCA is not complete satisfactory since they still fail some randomness tests.

To improve the randomness of CA, the approach to enhance 1-d PCA by adding cell control signals on some cells and to control the status of CA has been reported (see Non-Patent Document 6). The initial idea was further refined to the concept of neighbor-changing CA (NCA). The randomness test results on the 1-d NCA showed that they are better than 1-d PCA. In Non-Patent Document 6, 1-d NCA are evolved to its best performance with minimal cost.

On the other hand, an alternative reported approach was to employ two-dimensional (2-d) CA in pseudorandom number generation to improve further the randomness quality of CA PRNGs. In Non-Patent Document 1, it has been reported that evolved a 64-cell 2-d CA that could pass the DIEHARD test Non-Patent Document 11, which is said to be the most difficult test suite to pass currently. The comparison on randomness test results shows that 2-d CA are comparable to 1-d NCA in randomness. But the structural complexity of 2-d CA is a little higher compared to 1-d CA.

Recently, two keystream generators based on the linear cellular automata over GF(2), called PCA with ROM and Two Stage PCA were proposed in Non-Patent Document 14 together with results of their security analysis.

On the other hand, a method for reconstructing of a binary nonlinear CA initial state based on the sequence of bits generated by a central CA cell is given in Non-Patent Document 15. The inversion algorithm which computes the predecessor of a given state, assuming a nonlinear transition rule and CA over GF(2) is proposed in Non-Patent Document 16.

Cryptographic security analysis of the Two Stage PCA and the PCA with ROM have been reported in Non-Patent Documents 17 and 18, respectively, where some vulnerabilities of these schemes on certain cryptanalytic attacks, assuming ciphertext only attacks, are demonstrated, and it is shown that the effective secret key size is significantly smaller than its formal length. The same weaknesses are pointed out in Non-Patent Document 19 assuming known plain text attacks.

Recently, an improved key stream generator based on PCA with ROM was proposed and analyzed in Non-Patent Document 20 assuming operations over GF(2). A keystream generator application of CA over GF(q), q>2, has been reported Non-Patent Document 10.

Apparatus and Method According to the Present Embodiment

A keystream generator according to the present embodiment includes the following two parts, called α block and β block.

the first part, α block, provides
  long period.
  good statistics.
  basic unpredictability;
the second part, β block, provides
  enhanced final unpredictability.

The underlying ideas for of the α block include the following:
(1) Employment of certain recently reported results on cellular automata and CA based pseudorandom number generators which yield background for controlling the following two characteristics of the building block output sequences.
  statistical characteristics (randomness), and
  period.
(2) Providing unpredictability of a block output sequence via employment of a time varying algorithm for its generation, and particularly providing the following.
  Resistance against reported and improved fast correlation attacks and algebraic attacks.

The α block is configured to include the building block consists of certain parts, and each of them contribute to one or two of the following items:
  long period,
  good statistics,
  unpredictability.

The structure of a block includes 2-by-L CA, 2D-CA and CCA, which are described in detail in previous embodiments. The similar elements are designated by the same numerals, and descriptions thereof are omitted for the sake of simplicity.

Main role of the β block is to enhance unpredictability of the output sequences from the α block.

It could be considered that the output sequence from the α block is buffered, and processing by the β block is performed via the following two operations:
  filtering by a nonlinear function with memory, and
  nonuniform decimation of the sequence obtained from the previous step.

Figure 7:
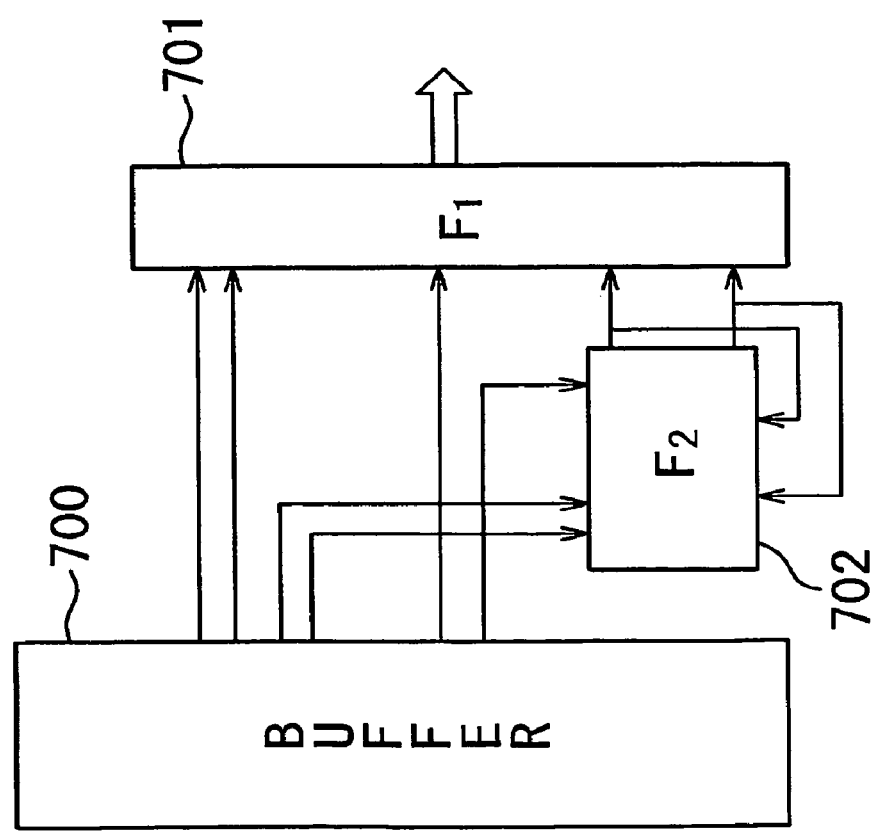
FIG. 7 is a block scheme of nonlinear mapping with memory in accordance with a third embodiment of the present invention.
Figure 8:
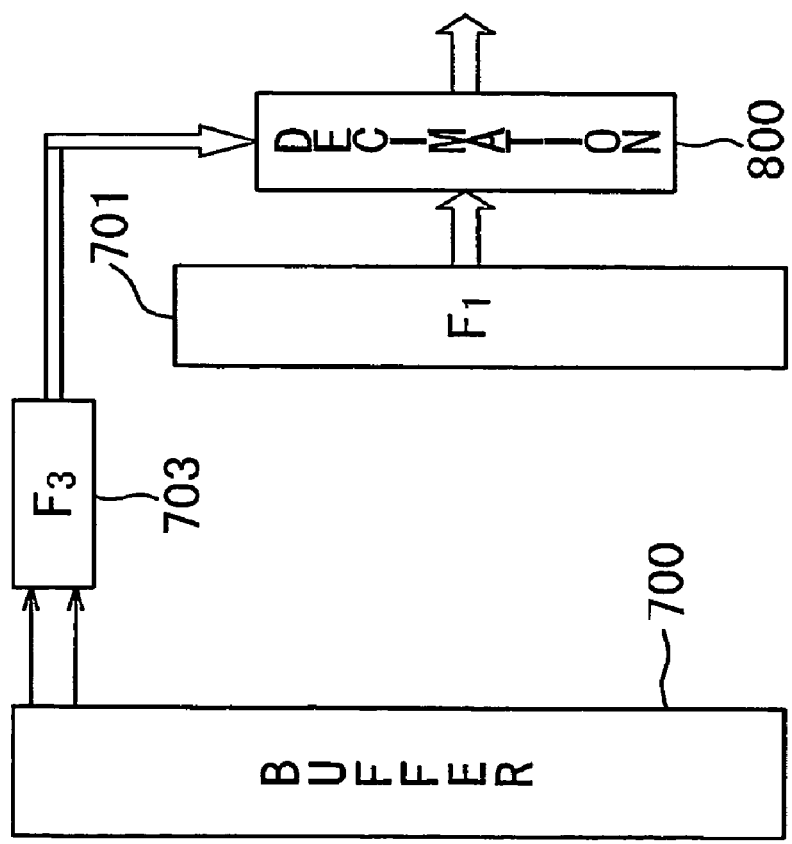
FIG. 8 is a block scheme of non-uniform decimation in accordance with a third embodiment of the present invention.

Examples of the processing performed by the β block are displayed in FIGS. 7 and 8. FIG. 7 shows an example of block scheme of nonlinear mapping with a memory using nonlinear functions F1 (701) and F2 (702). Buffer 700 stores the output sequence from the α block. FIG. 8 shows an example of block scheme of nonuniform decimation with nonlinear functions F1 (701) and F3 (703). A decimation means 800 decimates output sequence from the nonlinear function F1 under control of output from the nonlinear function F3.

Figure 9:
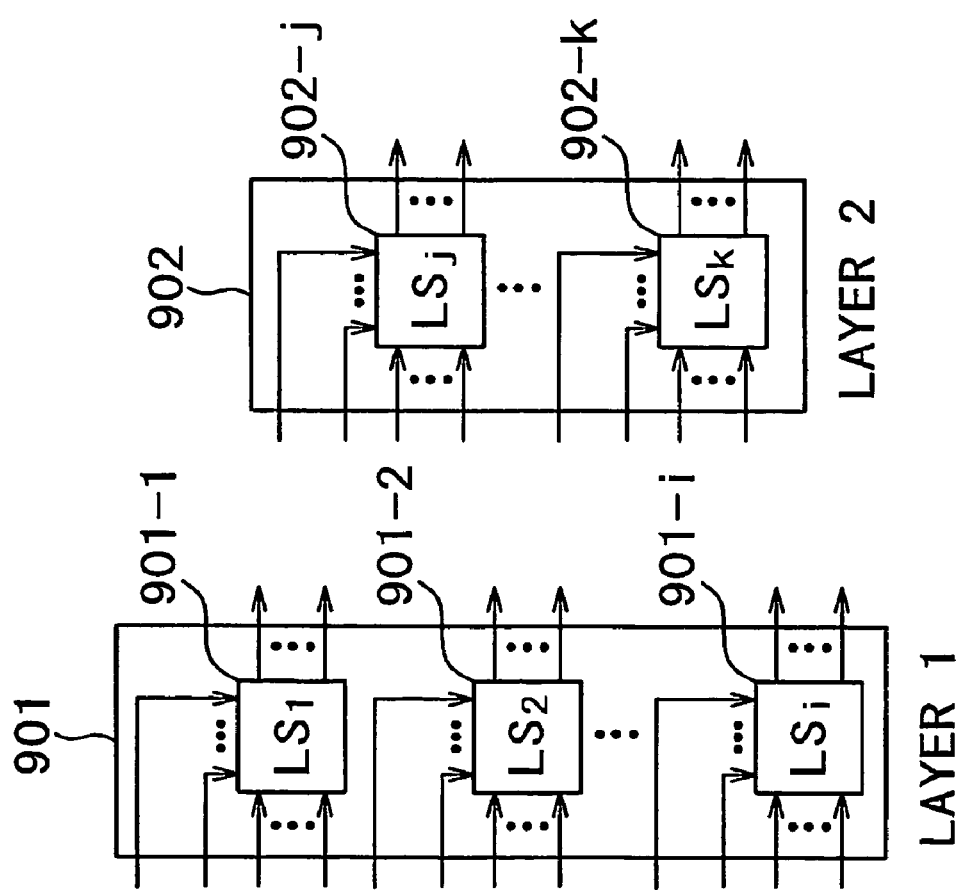
FIG. 9 is a schematic diagram showing typical forms of non-linear mapping based on Latin Square.

FIG. 9 displays an example of general form of the employed nonlinear mapping. Each of the employed functions F1, F2 and F3 follows the general nonlinear mapping scheme based on the Latin Squares (LS).

Each of the employed nonlinear functions consists of a plurality of the Latin Square Tables as shown in FIG. 9. Each of these Latin Square tables perform a mapping $\{0, 1\}^M \times \{0, 1\}^M \to \{0, 1\}^M$. In a typical case, each nonlinear function is a structure consisting of two layers, i.e., Layer 1 and Layer 2. The Layer 1 consists of a plurality of Latin Square tables, 901-1, 901-2, ..., 901-i, and the Layer 2 consists of a plurality of Latin Square tables, 901-j, ..., 901-k.

In the processing shown in FIG. 8, according to the weight of the decimation word outputted from the nonlinear function F3 (703), the keystream generator performs a plurality of complete cycles without outputting the generated bits.

Figure 10:
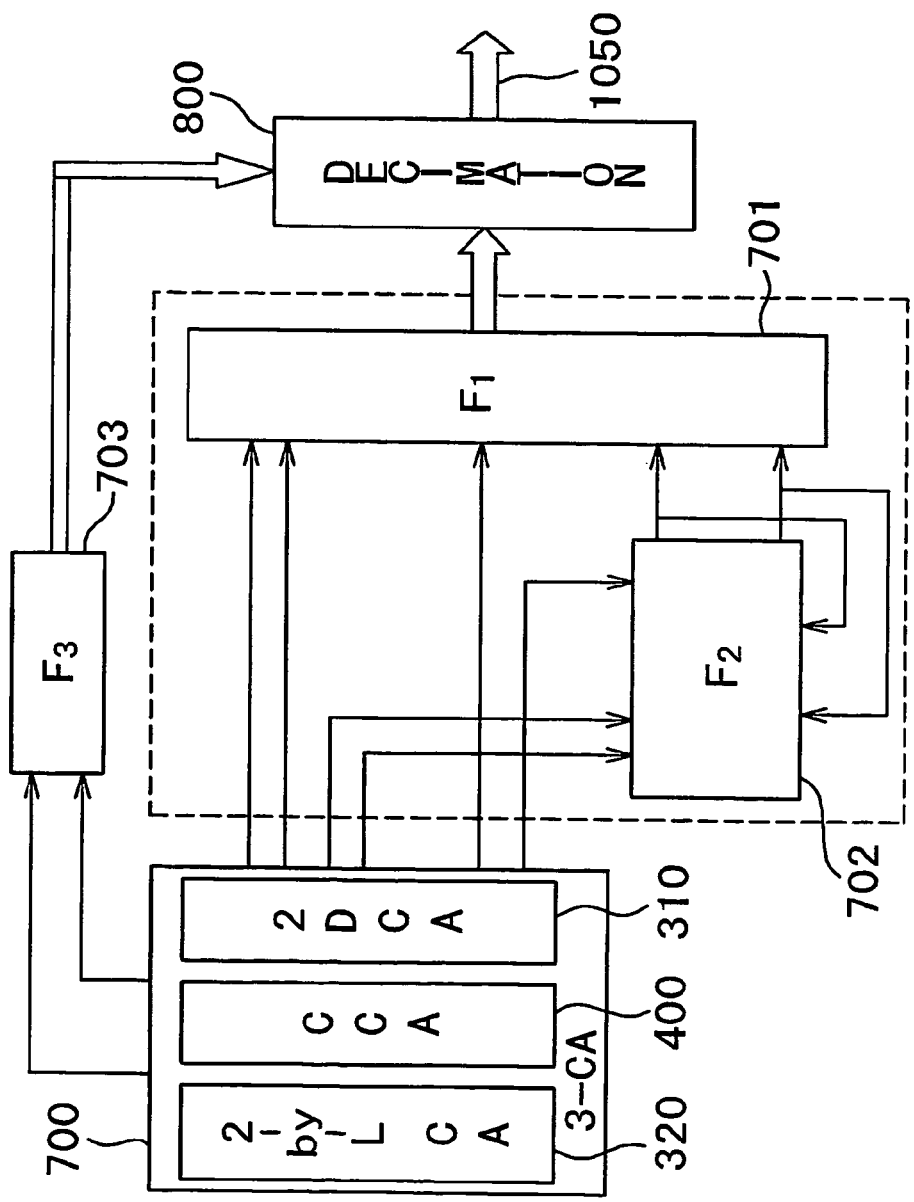
FIG. 10 is a schematic diagram showing an example structure of pseudorandom sequence generator in accordance with a third embodiment of the present invention.

FIG. 10 shows an example of block scheme of the keystream sequence generator. The keystream sequence generator includes:
  3 different classes of Cellular Automata (CA), 310, 320, 400;
  3 different nonlinear functions 701-703 based on the Latin Squares: F1, F2 and F3;
  F1 and F2 play a role of nonlinear combiner/filter with a memory;
  A block for nonuniform decimation 800 of the basic keystream sequence.

In the present embodiment, as the three different classes of CAs, the 2-by-L CA 320, the two dimensional CA (2DCA) 310 and the controllable/programmable CA (CCA) 400 are employed. Detail characteristics of each CA are described above in the corresponding sections in the descriptions for the first and second embodiments. It should be noted that the total number of employed cells is one of the family parameters in the present embodiment.

Three employed CA form a substructure called 3-CA. These three CA are combined in such a manner that the resulting 3-CA substructure yields the following:
  high non-linearity (and unpredictability);
  guaranteed lower bound on the period of the output sequence;
  verified statistical characteristics of the output sequence.

The 3-CA structure displayed in FIG. 10 works as follows:
  Initialization: Initialize all the cells employing a sequence of independent random bits.
  Sequence Generation: Each cycle of the 3-CA structure includes the following steps:
  (1) Run one cycle of 2-by-L CA updating all its cells;
  (2) Run one cycle of 2D-CA updating all its cells;
  (3) Specify the CCA rule control word based on 2D-CA cells;
  (4) Specify the state control word based on 2-by-L CA cells;
  (5) Run one cycle of CCA updating all its cells; and
  (6) Perform bit-by-bit mod2 addition of corresponding CCA, 2D-CA and 2-by-L CA cells.

Accordingly, the keystream generator operations includes two steps: initialization and keystream generation.

The initialization of the keystream generator is required before any keystream generation. The re-synchronization of the keystream generator assumes the same operations as the initialization.

Main steps of the initialization are the following:
  setting the initial values of all CA cells;
  run the keystream generator M times without any outputting, where M is a parameter of the keystream generators family.

Next, in each working cycle, the main operations of keystream generation within the keystream generator are executed. The keystream generation includes:
(1) updating all CAs;
(2) generation of the nonlinear functions outputs;
(3) according to the decimation rule go to the step (4) or repeat the steps (1) and (2); and
(4) generation of the output sequence block (the keystream block).

As described above, the keystream generator according to the present embodiment yields possibility for selection of certain family members suitable for wide range of particular implementation or application constraints. The keystream generators of the present embodiment are particularly suitable for hardware implementations, and for a variety of applications requiring highly random, huge period, and practically unpredictable sequences.

Fourth Embodiment

According to the fourth embodiment of the present invention, there is provided an apparatus capable of performing an cryptographic processing using a pseudorandom number generator according to any one of the embodiments described above.

Figure 11:
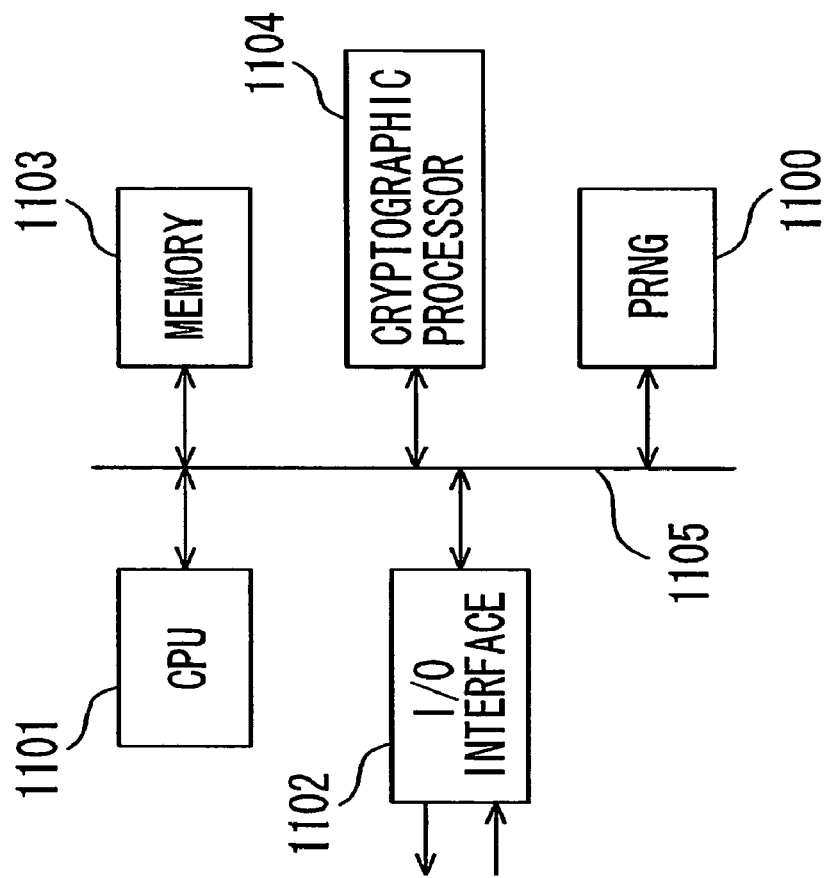
FIG. 11 is a schematic diagram showing an example structure of cryptographic processing apparatus in accordance with a fourth embodiment of the present invention.

FIG. 11 shows an example of such an apparatus. The apparatus may be realized with an information processing apparatus such as a computer system or an IC module. The apparatus includes, for example, a pseudorandom number generator (PRNG) 1100 in accordance with one of the embodiments described above, a CPU 1101, an I/O interface 1102, a memory 1103, a cryptographic processor 1104 and a bus 1105.

The CPU 1101 performs various operations and programs such as controls of cryptographic processing, data transmission/reception, data transfer among constituting units, etc. The memory 1103 includes a ROM for storing programs to be executed by the CPU 1101 and fixed operation parameters, and a RAM that is used as a storage area and/or work area for the programs to be executed and changing parameters. Further, the memory 1103 may include a secure memory area for storing security data such as key data or the like, which are required for cryptographic processing. It is preferable to configure such secure memory area with anti-tamper structure.

The cryptographic processor 1104 performs a cryptographic processing such as stream cipher processing and/or decipher processing. Alternatively, the cryptographic processor 1104 may be realized by storing cryptographic processing programs in the ROM in advance and causing the CPU 1101 to read out and execute the program.

The PRNG 1100 generates pseudorandom numbers required for generating a key for the cryptographic processing. The PRNG 1100 is based on CA and may have one of structures shown in FIGS. 3, 6 and 10.

The I/O interface 1102 interfaces with external devices for, for example, inputting information designating a key to be used and outputting encrypted text data based on the key. Alternatively, the I/O interface 1102 may be a data communication unit for data communication with external devices such as a media reader/writer or a IC module or another apparatus.

It should be understood by those skilled in the art that various modifications, combinations, sub-combinations and alterations may occur depending on design requirements and other factors insofar as they are within the scope of the appended claims or the equivalents thereof.

The invention claimed is:
1. An apparatus for generating pseudorandom sequences comprising:
a two-dimensional cellular automata random number generator configured to generate a first sequence;
a 2-by-L cellular automata random number generator configured to generate a second sequence;
a controllable cellular automata random number generator configured to generate a third sequence by determining cell states based on a corresponding cell control word and/or a corresponding rule control word, wherein the cell control word is generated by the 2-by-L cellular automata random number generator and the rule control word is generated by the two-dimensional cellular automata random number generator;
adders configured to perform bit-to-bit mod2 sum of the first, second and third sequences;
a first block configured to perform a nonlinear mapping on the summation results from the adders; and
a second block configured to perform a non-uniform decimation on the results of the nonlinear mapping, wherein the decimated result is outputted as a pseudorandom sequence.
2. The apparatus according to claim 1, wherein:
each of the first and second blocks include at least one nonlinear function.
3. The apparatus according to claim 1, wherein:
the second block includes at least one look-up table for nonlinear mapping based on the Latin squares.
4. An apparatus for performing cryptographic processing comprising:
a cryptographic processor configured to encrypt data using pseudorandom sequences; and
a pseudorandom sequence generator configured to generate pseudorandom sequences, wherein the pseudorandom number generator is configured to include the apparatus comprising:
a two-dimensional cellular automata random number generator configured to generate a first sequence;
a 2-by-L cellular automata random number generator configured to generate a second sequence;
a controllable cellular automata random number generator configured to generate a third sequence by determining cell states based on a corresponding cell control word and/or a corresponding rule control word, wherein the cell control word is generated by the 2-by-L cellular automata random number generator and the rule control word is generated by the two-dimensional cellular automata random number generator;
adders configured to perform bit-to-bit mod2 sum of the first, second and third sequences;
a first block configured to perform a nonlinear mapping on the summation results from the adders; and
a second block configured to perform a non-uniform decimation on the results of the nonlinear mapping, wherein the decimated result is outputted as a pseudorandom sequence.
5. A method for generating pseudorandom sequences using cellular automata in a pseudorandom sequence generator comprising:
generating, at a two-dimensional cellular automata random number generator, a first sequence;
generating, at a 2-by-L cellular automata random number generator, a second sequence;
generating, at a controllable cellular automata random number generator, a third sequence by determining cell states based on a corresponding cell control word and/or a corresponding rule control word, wherein the cell control word is generated by the 2-by-L cellular automata random number generator and the rule control word is generated by the two-dimensional cellular automata random number generator;

performing, at adders, bit-to-bit mod2 sum of the first, second and third sequences;

performing, at a first block, a nonlinear mapping on the summation results from the adders; and performing, at a second block, a non-uniform decimation on the results of the nonlinear mapping, wherein the decimated result is outputted as a pseudorandom sequence.

6. A non-transitory computer readable recording medium storing a computer program for causing a computer to execute a method for generating pseudorandom sequences using cellular automata, the method comprising:

generating, by a two-dimensional cellular automata random number generator, a first sequence;

generating, by a 2-by-L cellular automata random number generator, a second sequence;

generating, by a controllable cellular automata random number generator, a third sequence by determining cell states based on a corresponding cell control word and/or a corresponding rule control word, wherein the cell control word is generated by the 2-by-L cellular automata random number generator and the rule control word is generated by the two-dimensional cellular automata random number generator; and performing bit-to-bit mod2 sum of the first, second and third sequences;

performing a nonlinear mapping on the summation results; and performing a non-uniform decimation on the results of the nonlinear mapping, wherein the decimated result is outputted as a pseudorandom sequence.

7. The apparatus according to claim 1, wherein the first sequence generated by the two-dimensional cellular automata random number generator satisfies the DIEHARD test.

8. The apparatus according to claim 1, wherein the two-dimensional cellular automata random number generator generates two-dimensional cellular automata including 64 cells.

9. The apparatus according to claim 1, wherein the two-dimensional cellular automata random number generator generates two-dimensional cellular automata arranged in an 8×8 array.

10. The apparatus according to claim 1, further comprising:

a buffer configured to buffer results of the bit-to-bit mod2 sum.

11. The apparatus according to claim 1, wherein the adders output pseudorandom sequences with a controllable period.

12. The apparatus according to claim 1, wherein the controllable cellular automata random number generator includes a plurality of cell units.

13. The method for generating pseudorandom sequences according to claim 5, further comprising:

generating a key for cryptographic processing based on the generated pseudorandom sequences.

14. The method for generating pseudorandom sequences according to claim 5, further comprising:

interfacing with an external device.

15. The method for generating pseudorandom sequences according to claim 14, wherein the interfacing includes inputting information designating the key to be used and outputting encrypted text data based on the key.

* * * * *